(12) United States Patent
Granath

(10) Patent No.: US 6,209,595 B1
(45) Date of Patent: Apr. 3, 2001

(54) DISPENSER WITH FUNNEL OVERCAP

(75) Inventor: Thomas C. Granath, Mineola, NY (US)

(73) Assignee: OMS Investments, Inc., Wilmington, DE (US)

( * ) Notice: Subject to any disclaimer, the term of this patent is extended or adjusted under 35 U.S.C. 154(b) by 0 days.

(21) Appl. No.: 09/498,327

(22) Filed: Feb. 4, 2000

(51) Int. Cl.⁷ .............................. B65B 39/00; B67C 11/04
(52) U.S. Cl. ........................ 141/340; 141/331; 222/106; 222/107; 222/460; 222/461; 222/523
(58) Field of Search ..................... 141/311 R, 331–345; 222/460, 461, 523, 525, 106, 107, 206, 212, 215

(56) References Cited

U.S. PATENT DOCUMENTS

| | | | |
|---|---|---|---|
| 589,659 | * 9/1897 | Krack | 141/340 |
| 1,264,503 | 4/1918 | Griffin . | |
| 1,631,951 | 6/1927 | McAnsh . | |
| 2,752,082 | * 6/1956 | Nergaard | 141/340 |
| 3,372,846 | 3/1968 | Berkus | 222/479 |
| 4,291,814 | 9/1981 | Conn | 220/90.4 |
| 5,388,712 | 2/1995 | Brody | 215/229 |
| 5,662,249 | * 9/1997 | Grosse | 222/461 |
| 5,996,858 | 12/1999 | Tapp et al. | 222/538 |
| 6,029,864 | * 2/2000 | Nilsson et al. | 222/466 |

FOREIGN PATENT DOCUMENTS

| | | |
|---|---|---|
| 05916061A1 | 4/1994 | (EP) . |
| 677401 | 8/1952 | (GB) . |
| 798158 | 7/1958 | (GB) . |
| 1305055 | 1/1973 | (GB) . |
| 1602199 | 11/1981 | (GB) . |
| 2286109A | 8/1995 | (GB) . |

* cited by examiner

Primary Examiner—Timothy L. Maust
(74) Attorney, Agent, or Firm—Abelman, Frayne & Schwab; Thomas E. Spath

(57) ABSTRACT

A refillable dispensing apparatus is disclosed in which a removable cap is utilized to protectively overlie the container during its storage condition and the cap may be readily converted into a funnel for refilling the depleted container. The conversion of the cap into a funnel is achieved by removing and reversing the cap, with the cap being configured and dimensioned to define a trough like container having a funnel extension which communicates with the container opening.

17 Claims, 6 Drawing Sheets

DISPENSER WITH FUNNEL OVERCAP

FIELD OF THE INVENTION

This invention relates to a refillable dispensing apparatus particularly adaptable for the dispensing of a granular product such as a lawn fertilizer, and which may be readily refilled with the lawn fertilizer as its contents are being depleted.

BACKGROUND OF THE INVENTION

U.S. Pat. No. 5,996,858 entitled "Dispensing Apparatus" and assigned to the assignee of the present invention discloses a dispensing container that has particular utility for the dispensing of granular products, such as a lawn fertilizer and may be provided with a telescopically operated duct device which is preferably rotatably connected to an outlet opening of the container. When the dispensing apparatus is not being utilized to appropriately distribute the granular lawn fertilizer contained therein, the duct device is telescopically contracted such that it is contained within the perimeter boundary of the container's top wall. A removable cap is placed over the container and its telescopically contracted duct device. The removable cap is manually secured to the container to protect the duct device and the container contents against accidental spillage both prior to consumer purchase of the dispensing apparatus, and during the user's storage thereof. When it is desired to utilize the dispensing apparatus, the cap is removed, the duct device is telescopically extended, and the granular particles dispensed therethrough.

In the course of extended use of the dispensing apparatus the granular particles contained therein naturally become depleted. For both environmental and cost effectiveness it is most desirable to be able to refill the container with an additional supply of the granular product which may be separately sold apart from the dispensing apparatus. This necessitates removing the duct device from the container opening and pouring the replacement granules into thee container via the container opening. Since the container opening may be relatively small it is desirable to conveniently permit such refilling of the container without requiring an auxiliary funnel, or other device.

SUMMARY OF THE INVENTION

The present invention simplifies the refilling of the dispensing apparatus in a cost effective and an extremely simple manner. The previously available cap which fits over the container in its storage condition has been modified to readily permit its conversion into a funnel. More specifically, a portion of the top wall of the cap is reconfigured into a funnel extension which, when the cap is removed and reversed, will interengage the container opening, with the reversed cap defining a trough-like volume for receiving the granular particles which are then refilled into the container via the interengagement of the funnel extension of the cap and container opening.

Accordingly the removable cap which is provided to overlie the top wall of the container will have three operable conditions. A first of those conditions is characterized by the cap being manually secured in engagement with the container to protectively maintain the cap over the container during its storage condition.

A second operative condition is characterized as the cap being disengaged from the container, and separated therefrom, such that the container opening, and duct dispensing device connected thereto, is accessible for dispensing the contents of the container.

The third condition, in accordance with the present invention, is characterized as the cap securement means being disengaged from the container securement means, but with the cap being reversed in orientation with respect to the first condition. The reversed cap is placed against the top wall with its funnel extension extending into the container opening, so as to permit replacement contents to refill the container. Such replacement contents are placed within the trough-like cap, which are then dispensed into the container via the connection of the cap funnel extension and container cap opening.

As another preferable feature of the present invention the container top wall and cap have cooperating support surfaces which will support the cap in its reversed orientation while the container is being refilled via the cap.

In accordance with another preferable feature of the present invention, the cap includes a removable seal for the funnel extension. The removable seal spans the interior area of the tunnel extension and will be in place when the dispensing apparatus is in the retail establishment, and prior to its sale. This prevents inadvertent spilling of the contents out of the container. After the unit is sold and its contents depleted the user will then wish to refill the container. The user may then remove the seal from the funnel extension. This opens the funnel extension and permits the reverse oriented cap to refill the container via the funnel extension.

It is therefore seen that a primary object of the present invention is to provide a refillable dispensing apparatus in which the cap, previously provided to protect the contents of the container during storage, may serve as a funnel for refilling the container.

A further object of the present invention is to provide such a dispensing apparatus in which the cap, as shown in U.S. Pat. No. 5,996,858, is modified to serve as a funnel during the refilling of the container.

An additional object of the present invention is to provide such a refillable dispensing apparatus in which the cap is removed from the container, reversed in orientation, and placed against the top wall of the container to place the cap in its refilling mode of operation.

These as well as other objects of the present invention become apparent upon consideration of the following drawing and description of a preferred embodiment.

DETAILED DESCRIPTION OF THE PREFERRED EMBODIMENTS

Reference is now made to FIGS. 1–8 which disclose a preferred embodiment of the present invention which is a modification of the dispensing apparatus shown in U.S. Pat. No. 5,996,858 assigned to the assignee of the present invention, the teachings of which are incorporated herein by reference. The dispenser apparatus comprises a hollow container 100, for the product to be dispensed, which may typically be a granular fertilizer. The container includes an integral handle 101 which extends upwards along one of the container sides. The container is advantageously provided with a recess 102 to allow the users' fingers to grip the inner surface of the handle 101. A cap 200 is releasably clipped onto the top of the container 100. The cap 200 may be made of translucent or, more preferably, transparent material.

Figure 4:
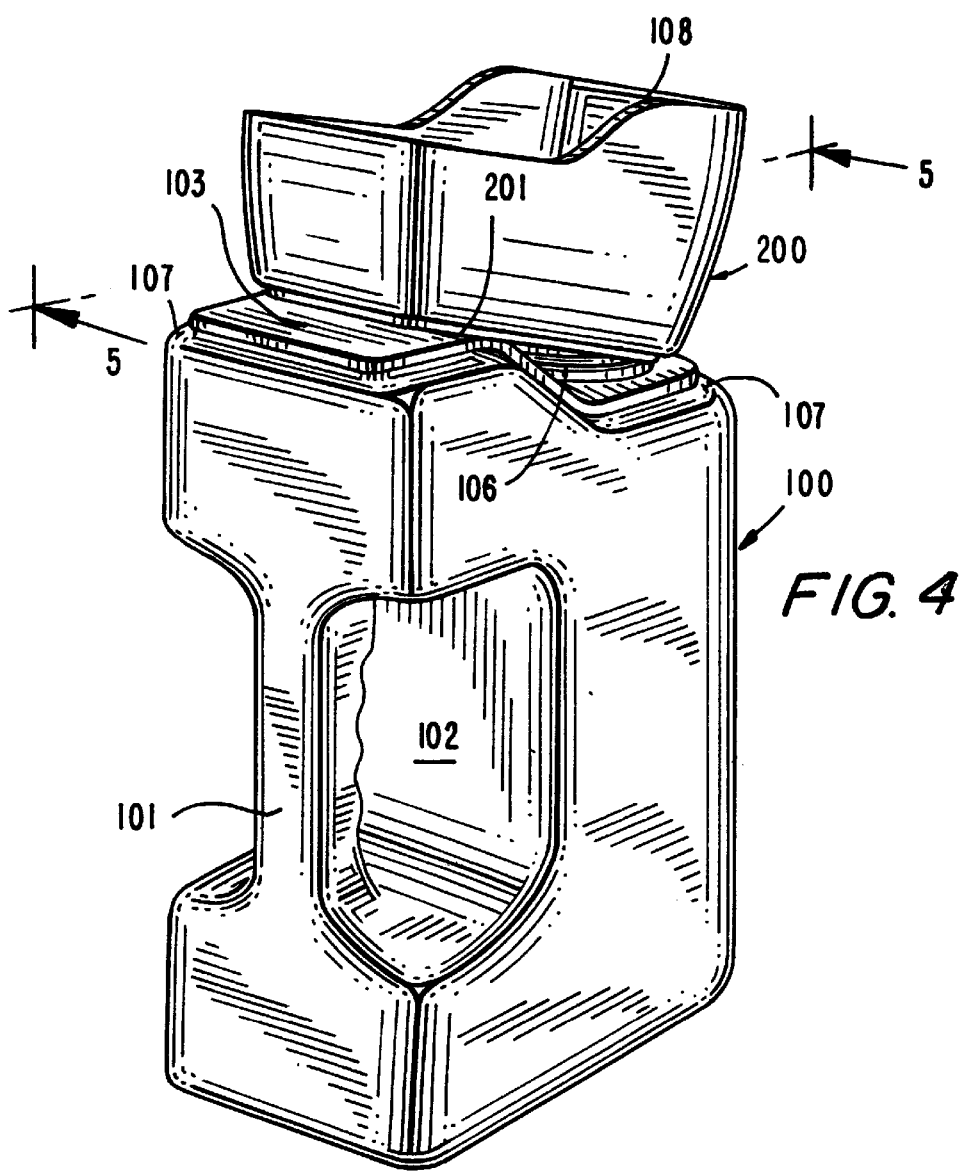
FIG. 4 is a perspective view of a dispensing apparatus shown in its refilling mode of operation.
Figure 5:
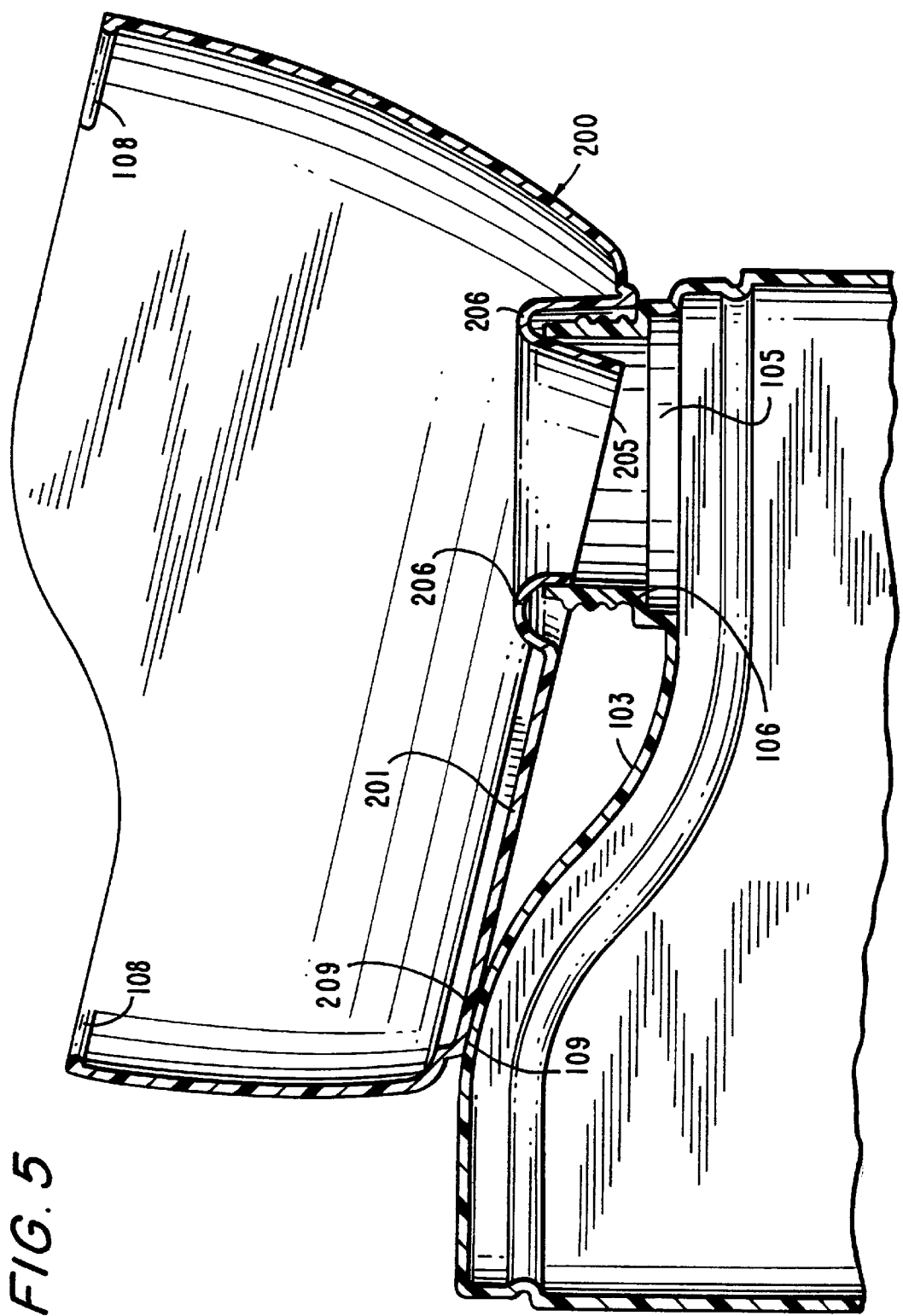
FIG. 5 is a cross sectional view as shown by the arrows 5—5 of FIG. 4 and looking in the direction of the arrows.

In accordance with the present invention the cap is modified with respect to the cap shown in U.S. Pat. No. 5,996,858 to permit it to function as a trough-like container with a funnel interconnection when it is desired to refill the container 100. This refillable mode of operation is shown in FIGS. 4 and 5 which are to be subsequently discussed.

The top wall 103 of the container includes an opening 105 surrounded by an externally threaded annular spout 106 for the dispensing of the container contents. In accordance with the present invention the container 100 is also refilled via opening 105.

Figure 1:
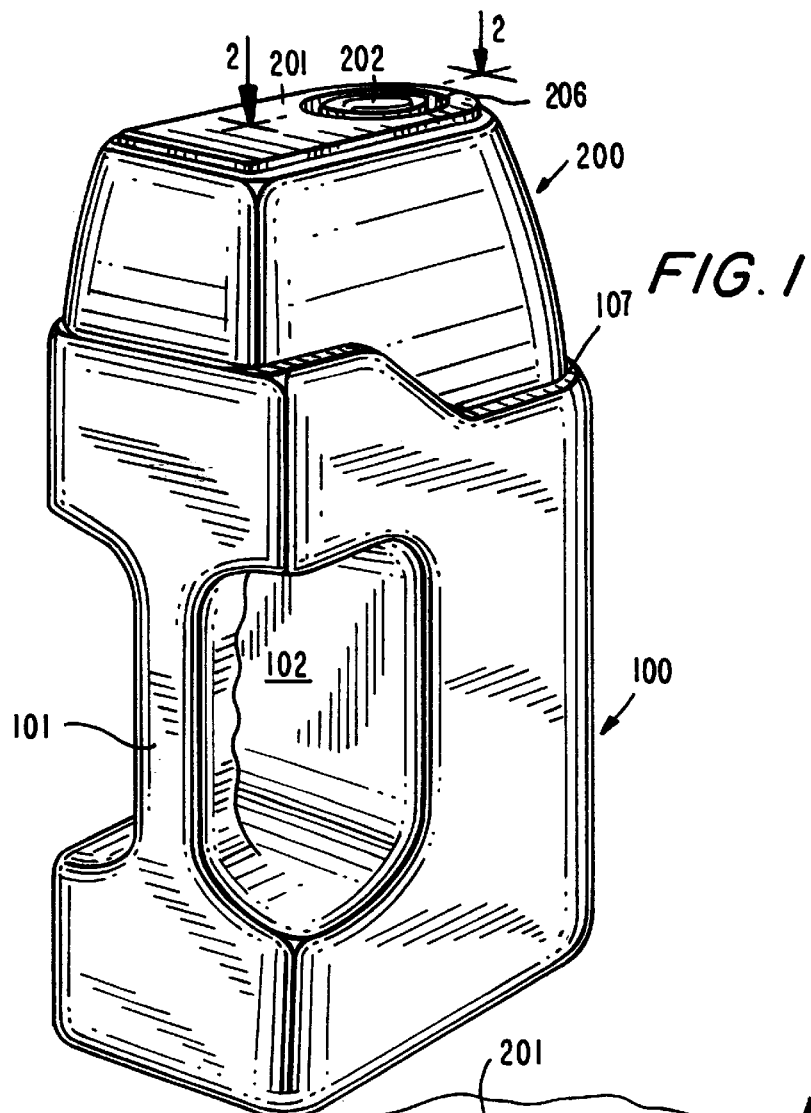
FIG. 1 is a perspective view of a dispensing apparatus in accordance with the present invention, shown in its storage mode.
Figure 2:
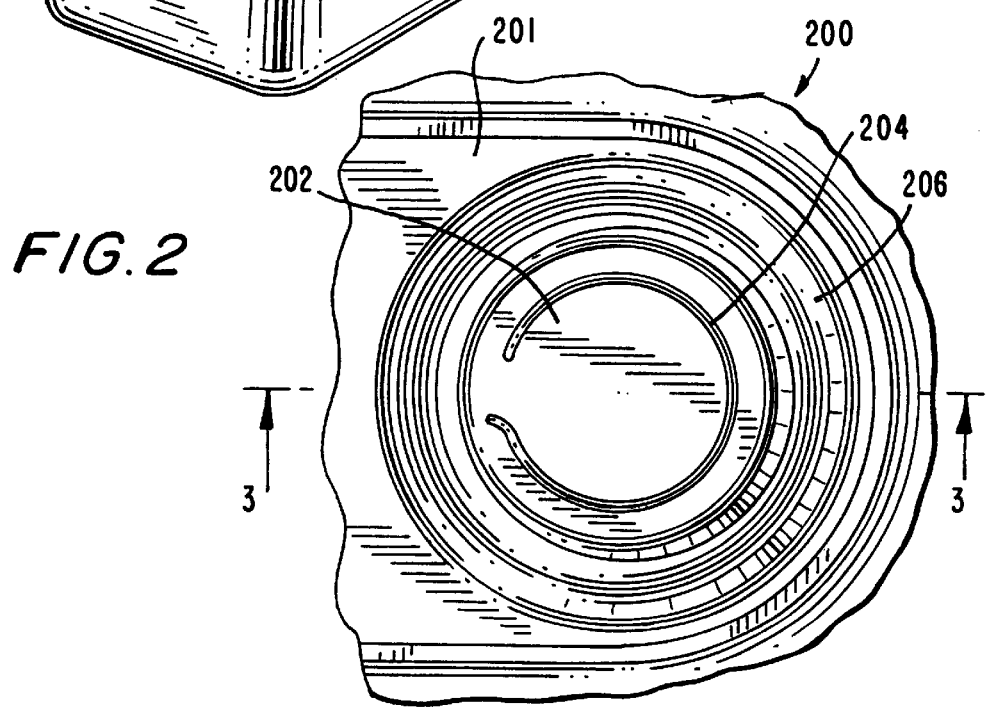
FIG. 2 is a partial top view of the dispensing apparatus as shown by the arrows 2—2 of FIG. 1 and looking in the direction of the arrows.
Figure 3:
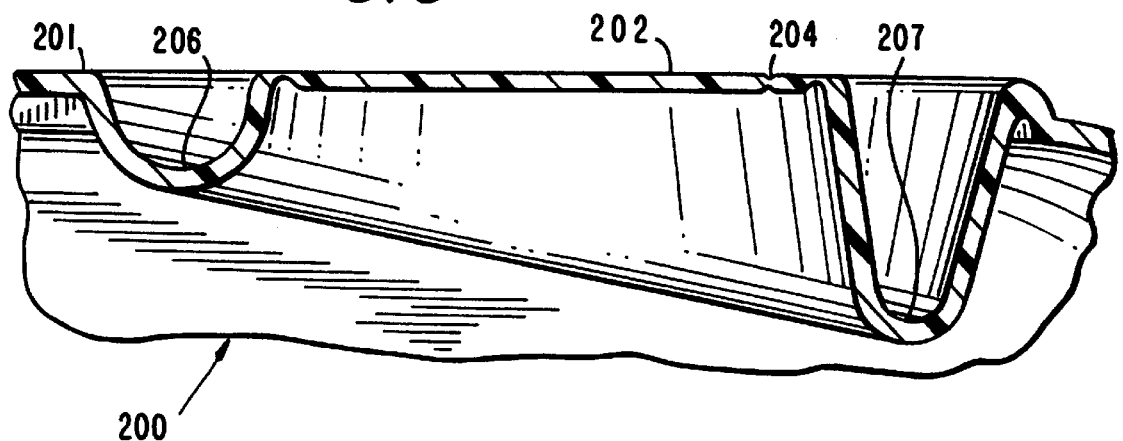
FIG. 3 is a cross sectional view as shown by the arrows 3—3 of FIG. 2 and looking in the direction of the arrows.
Figure 6:
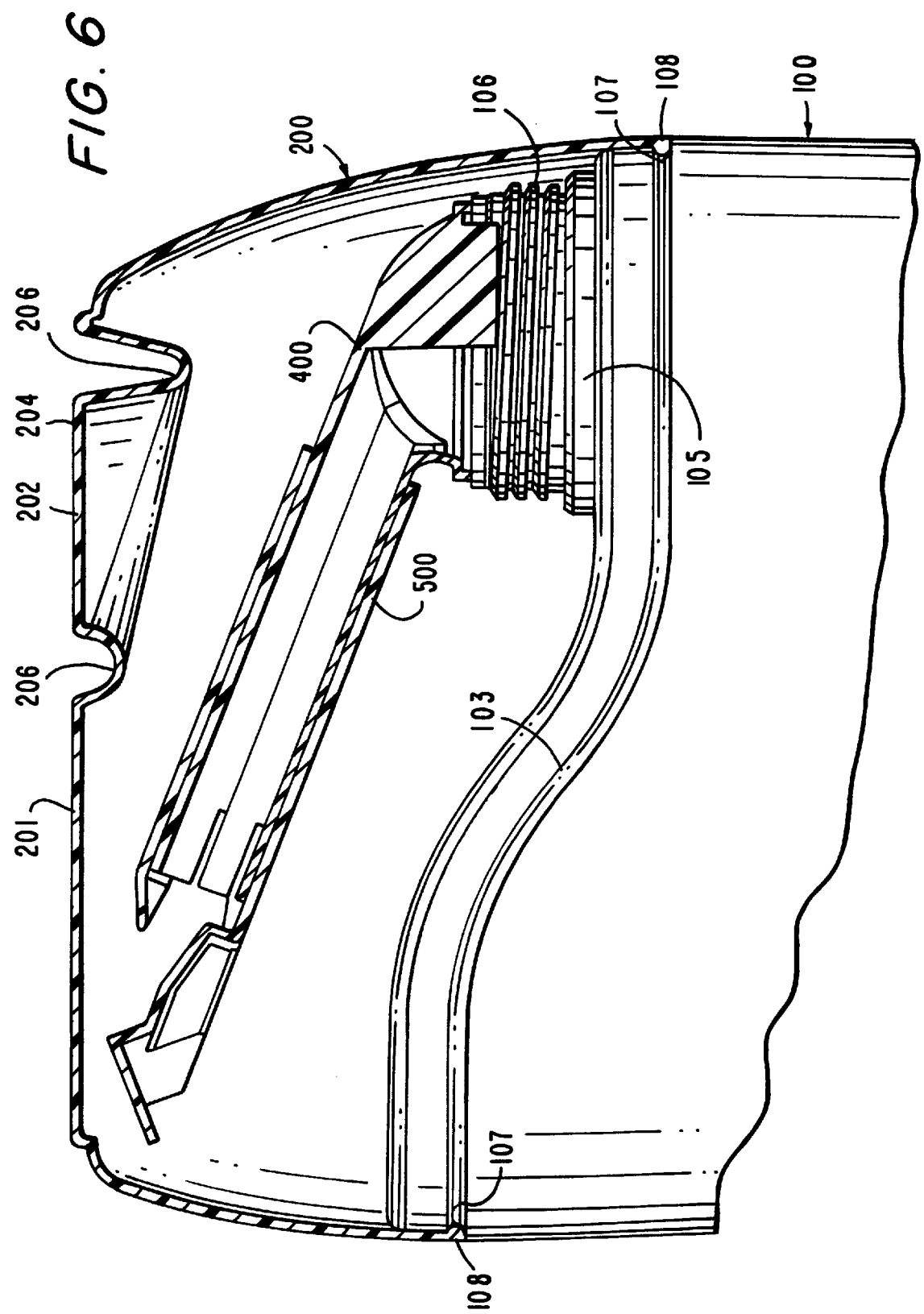
FIG. 6 is a cross sectional view of the upper portion of the dispenser apparatus, shown in the storage condition corresponding to FIG. 1.

An inward recess 107 is provided about the periphery of the container, immediately below the top wall 103, in order to receive complementary projections 108 on opposed sides of the cap 200 for securing the cap 200 in a manually releasable, snap like manner. Cap 200 is thereby secured to the container 100 when it is desired that the dispensing apparatus be in the stored condition as shown in FIGS. 1 and 6.

A telescopic dispensing duct device including sections 400, 500, as shown in aforementioned U.S. Pat. No. 5,996,858, is preferably provided. The duct device includes an internally screw threaded locking collar 300 for rotatably securing the duct device to the externally threaded container spout 106.

The first duct portion 400 is rotatably movable with respect to collar 300 with collar 300 then being tightened down against duct portion 400 to maintain it in its proper direction during the dispensing of contents 100. Further details of the construction of the duct device for the efficient dispensing of the contents of container 100 and its movement between the retracted stored condition of FIGS. 6 and 7 and telescopic outward position of FIG. 8 is detailed in the aforementioned U.S. Pat. No. 5,996,858.

In accordance with the present invention the top wall 201 of the cap 200 includes a funnel extension provided at one end thereof. The funnel extension includes a manually removable seal 202 having a lesser thickness weakened boundary 204. After the sale of the dispensing apparatus and the consumer desires to refill the container 100, the seal 202 is manually removed so as to provide an opening through the top wall 201 of the container. This opening, 205, is shown in FIG. 5 in which the cap 200 is in the refill mode of operation, with the duct device 400/500 having been removed during the refill operation. A funnel extension is provided about opening 205 by spaced annular recesses 206, 207. When it is desired to convert the cap 200 to its refill mode of operation, as shown in FIGS. 4 and 5, the cap is reversed with recesses 206 and 207 being spaced to engage the free ends of the annular spout 106 about the container opening 105. Thus, when cap 200 is reversed in orientation, the radially inward annular walls of recesses 206, 207 will establish a funnel-like extension which projects into the container spout 103. The reversed cap 200 creates a trough-like volume for receiving the materials to be dispensed into the container through the communication of its funnel extension and the container opening 105.

Advantageously the top walls 103 and 201 of the container and the cap are so configured, and the funnel extension 206, 207 appropriately oriented with respect to the annular walls of container spout 106, such that when the cap is in the refill mode, as best shown in FIG. 5, cooperating supporting surfaces 109, 209 will be in engagement for supporting the cap on the top wall 103 of container 100 during the refill mode of operation.

The three modes of operation will now be discussed.

When the dispensing apparatus is originally packaged for storage at the retail establishment, it will be in condition shown in FIGS. 1 and 6. That is, the duct device 400/500 will be in its retracted position, cap 200 secured to container 100 via the engagement of 107, 108 and funnel extension seal 202 in place. Seal 202 is advantageously provided to prevent any accidental spillage of the contents of the container 100 during the initial storage thereof.

Figure 7:
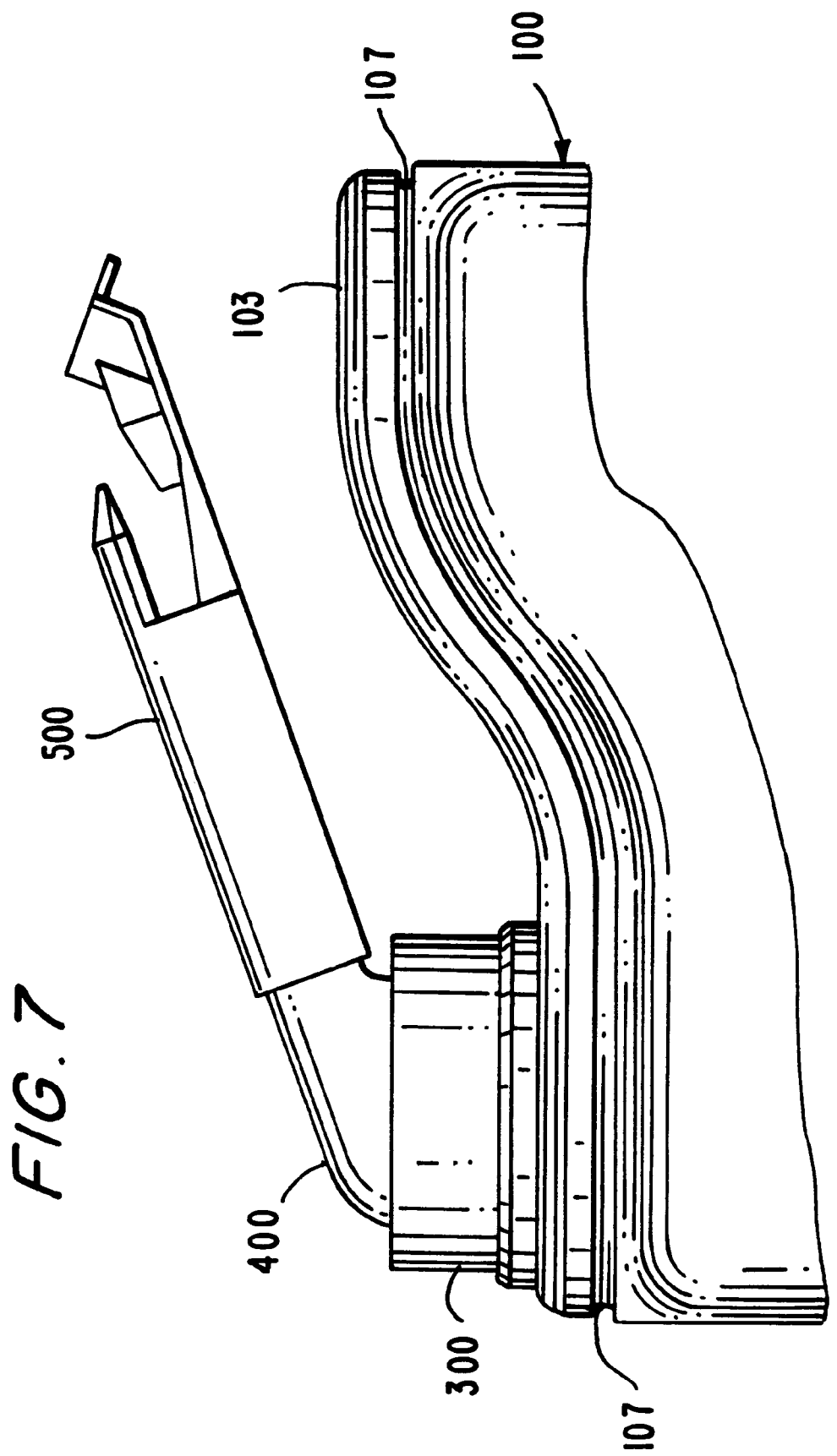
FIG. 7 is a partial side view of the upper portion of the dispenser apparatus with the cap removed and the duct device in its retracted, or stored, condition.
Figure 8:
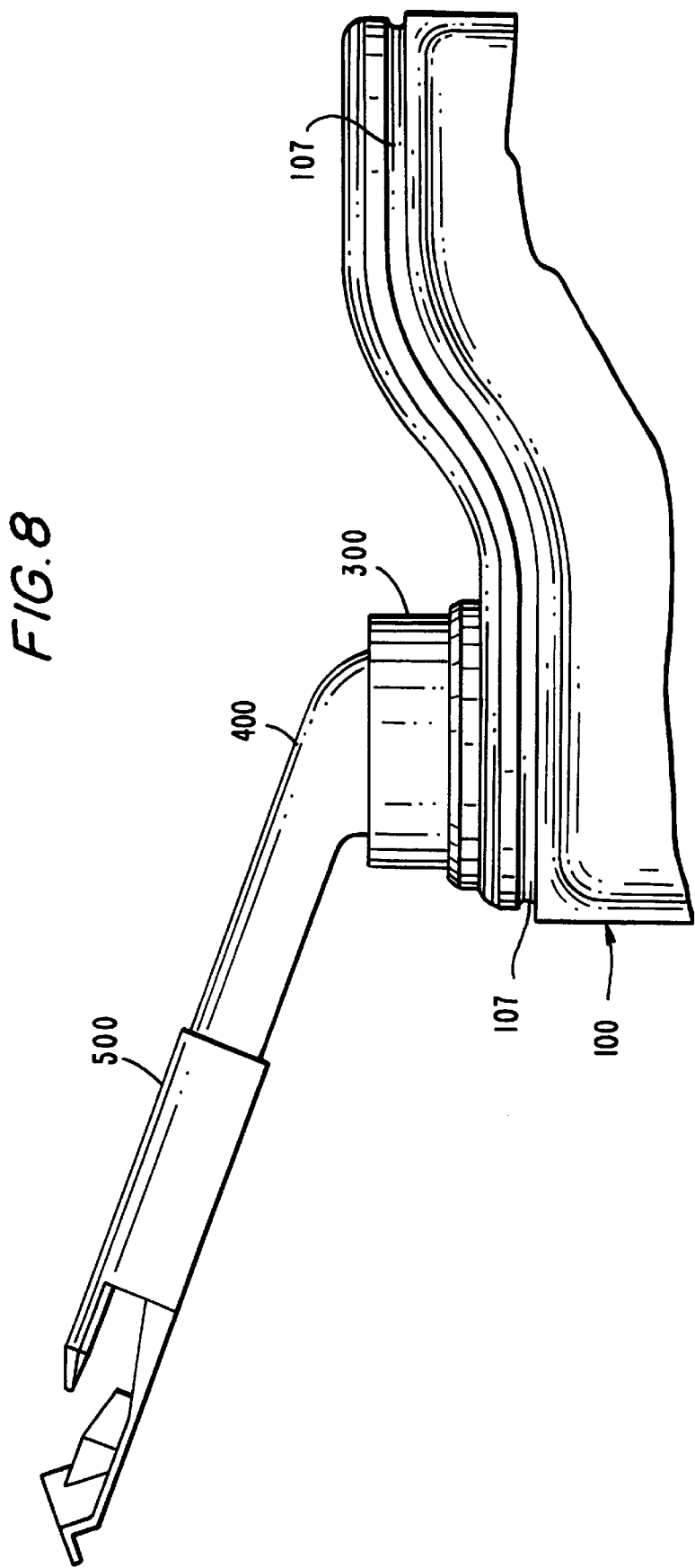
FIG. 8 is a partial side view corresponding to FIG. 7, but with the duct device telescoped out to its deployed position.

When the consumer desires to initially utilize the dispensing apparatus the cap 200 is removed, at which time the duct device 400–500 will still be in the retracted condition as shown in FIG. 7. The duct device 400, 500 is then preferably telescoped outwardly, collar 300 loosened so as to rotate the duct device 400, 500 to its desired orientation, and the collar then tightened. This is the second condition shown in FIG. 8.

When the contents of container 100 are depleted and it is desired to refill the container, the duct device 400/500 is first removed by the loosening of collar 300. Seal 202 is removed from the cap 200 and the cap 200 is then reversed in orientation, and placed on the top wall 103 of the container with its funnel extension placed within spout 106 of the container opening. The replacement contents are then placed within the trough formed by the reversed cap 200. Those contents then pass through the funnel extension of cap 200 into the container 100. Cap 200 is them removed, and the duct device 400/500 replaced for further dispensing of the contents.

It is therefore seen that the present invention provides a cost effective and simple way of refilling the container 100. The preferred embodiment achieves this with only a relatively minor modification of the cap construction shown in U.S. Pat. No. 5,996,858.

While the invention has been described with reference to a preferred embodiment, that embodiment is only exemplary, and it is not intended to be limiting. For example, numerous other constructions of containers with a cap having the ability to reverse to form a funnel for refilling the container are encompassed by the scope of the invention. Accordingly the invention shall be defined by the following claims:

I claim:

1. A refillable dispensing apparatus comprising:
   a container for a product to be dispensed, said container including side walls and opposed top and bottom walls, and an opening within said top wall for product dispensing and filling;

a removable cap for overlying and enclosing at least a portion of said top wall, with manually operable securement means for selectively securing said cap to said container and removing said cap from said container;

said cap having first, second, and third operative conditions with respect to said container;

said first condition characterized by said cap securement means being in engagement with cooperative container securement means for securably maintaining said cap over said top wall and providing a protective cover for said container opening and said portion of said top wall;

said second condition characterized as said cap securement means being disengaged from said container securement means, said cap being separated from said container and said container opening being accessible for dispensing the contents of said container; and said third condition characterized as said cap securement means being disengaged from said container securement means, said cap being reversed in orientation with respect to said first condition, and said cap including a funnel extension passing through said container opening and into said container, the reversed orientation of said cap defining a trough-like volume for receiving materials to be dispensed into said container through said funnel extension and container opening.

2. In a refillable dispensing apparatus according to claim 1, wherein:

said container including an annular extension surrounding said container opening to provide a spout, said annular extension having exterior and interior walls; said funnel extension having an exterior wall dimensioned to engage the interior wall of said annular extension when said cap is in said third condition.

3. In a refillable dispensing apparatus according to claim 1, wherein said container top wall and cap having cooperating support surfaces for supporting said reversed orientation cap on said container top wall when said cap is in said third condition.

4. In a refillable dispensing apparatus according to claim 2, wherein said dispensing apparatus further includes a removable duct device for dispensing the contents for said container when said cap is in said second condition, said duct device including a first portion having an inner annular wall dimensioned to snugly engage the exterior wall of said container opening annular extension.

5. In a refillable dispensing apparatus according to claim 4, said duct device further including a second duct portion which is telescopically connected to said first duct portion, said second duct portion having a first retracted condition wherein said duct portion is completely within the boundary of said container top wall and said cap may be placed thereover to establish said second cap condition, and said second duct portion telescopically extendible to a second dispersing condition when said cap is in said second condition and said second duct portion extends beyond the boundary of said interior top wall.

6. In a refillable dispensing apparatus according to claim 1, said cap further including a removable seal spanning the interior area of said funnel extension.

7. In a refillable dispensing apparatus according to claim 2, said cap further including a removable seal spanning the interior area of said funnel extension.

8. In a refillable dispensing apparatus according to claim 4, said first portion being rotatably connected to said container annular extension.

9. In a refillable dispensing apparatus according to claim 2, said cap further including an annular recess surrounding said funnel extension, said annular recess defined by said exterior funnel wall, a radially outward annular wall and a bottom wall, said container opening annular extension located within said annular recess when said cap is in its third operative condition.

10. In a refillable dispensing apparatus according to claim 1, said apparatus further comprising a duct device for removable attachment to said opening for dispensing the contents of said container when said cap is in said second condition, wherein said cap in said first condition covers said duct device attached to said opening.

11. A refillable dispensing apparatus comprising:

a container for a product to be dispensed, said container including side walls and opposed top and bottom walls, an opening within said top wall, and an annular extension with exterior and interior walls surrounding said opening to provide a spout for product dispensing and filling;

a removable cap for overlying said top wall, with manually operable securement means for selectively securing said cap to said container and removing said cap from said container;

said cap having first, second, and third operative conditions with respect to said container;

said first condition characterized by said cap securement means being in engagement with cooperative container securement means for securably maintaining said cap over said top wall and providing a protective cover for said container opening;

said second condition characterized as said cap securement means being disengaged from said container securement means, said cap being separated from said container and said container opening being accessible for dispensing the contents of said container; and said third condition characterized as said cap securement means being disengaged from said container securement means, said cap being reversed in orientation with respect to said first condition, and said cap including a funnel extension passing through said container opening and into said container, the reversed orientation of said cap defining a trough-like volume for receiving materials to be dispensed into said container through said funnel extension and container opening, wherein said funnel extension has an exterior wall dimensioned to engage the interior wall of said container opening annular extension and cap further includes a annular recess surrounding said funnel extension and defined by said exterior funnel wall, a radially outward annular wall and a bottom wall, said annular extension being located within said annular recess, which has a depth closely corresponding to the length of said annular extension such that the free end of said annular extension contacts said bottom wall of said recess to support said funnel extension on said container, when said cap is in said third condition.

12. In a refillable dispensing apparatus to claim 11, said cap further including a removable seal spanning the interior of said funnel extension, said removable seal initially closing the upper end of said funnel extension when said cap is in its first operative condition, and said seal being manually removable to convert said cap to said third condition.

13. In a refillable dispensing apparatus according to claim 11, said cap including a portion spaced from funnel extension for resting against said top wall of said container when said cap is in said third condition.

14. A refillable dispensing apparatus comprising:

a container for a product to be dispensed, said container including side walls and opposed top and bottom walls, and an opening within said top wall;

a duct device removably attached to said opening, said duct device being movable between a deployed position for product dispensing and filling from said opening and a stored position overlying said top wall;

a removable cap for overlying said top wall and said duct device, with manually operable securement means for selectively securing said cap to said container and removing said cap from said container;

said cap having first, second, and third operative conditions with respect to said container;

said first condition characterized by said cap securement means being in engagement with cooperative container securement means for securably maintaining said cap over said top wall and providing a protective cover for said container opening and said duct device;

said second condition characterized as said cap securement means being disengaged from said container securement means, said cap being separated from said container and said duct device being accessible for dispensing the contents of said container; and said third condition characterized as said cap securement means being disengaged from said container securement means, said cap being reversed in orientation with respect to said first condition, and said cap including a funnel extension passing through said container opening and into said container, the reversed orientation of said cap defining a trough-like volume for receiving materials to be dispensed into said container through said funnel extension and container opening.

15. In a refillable dispensing apparatus according to claim 14, said duct device having a first portion removably attached to said container and a second portion telescopically connected to said first duct portion, wherein said second duct portion is in a first retracted position and said dispensing device overlies said top wall of said container completely within the boundaries thereof when said dispensing device is in said stored position, and said second duct portion is in a second extended position when said dispensing device is in said deployed condition.

16. In a refillable dispensing apparatus according to claim 15, said cap substantially enclosing said container top wall.

17. In a refillable dispensing apparatus according to claim 16, said cap further including a removable seal spanning the interior of said funnel extension, said removable seal initially closing the upper end of said funnel extension when said cap is in its first operative condition, and said seal being manually removable to convert said cap to said third condition.

* * * * *